Oct. 19, 1943.  C. C. BUSENKELL  2,332,432
CONTROL APPARATUS
Filed Oct. 3, 1940
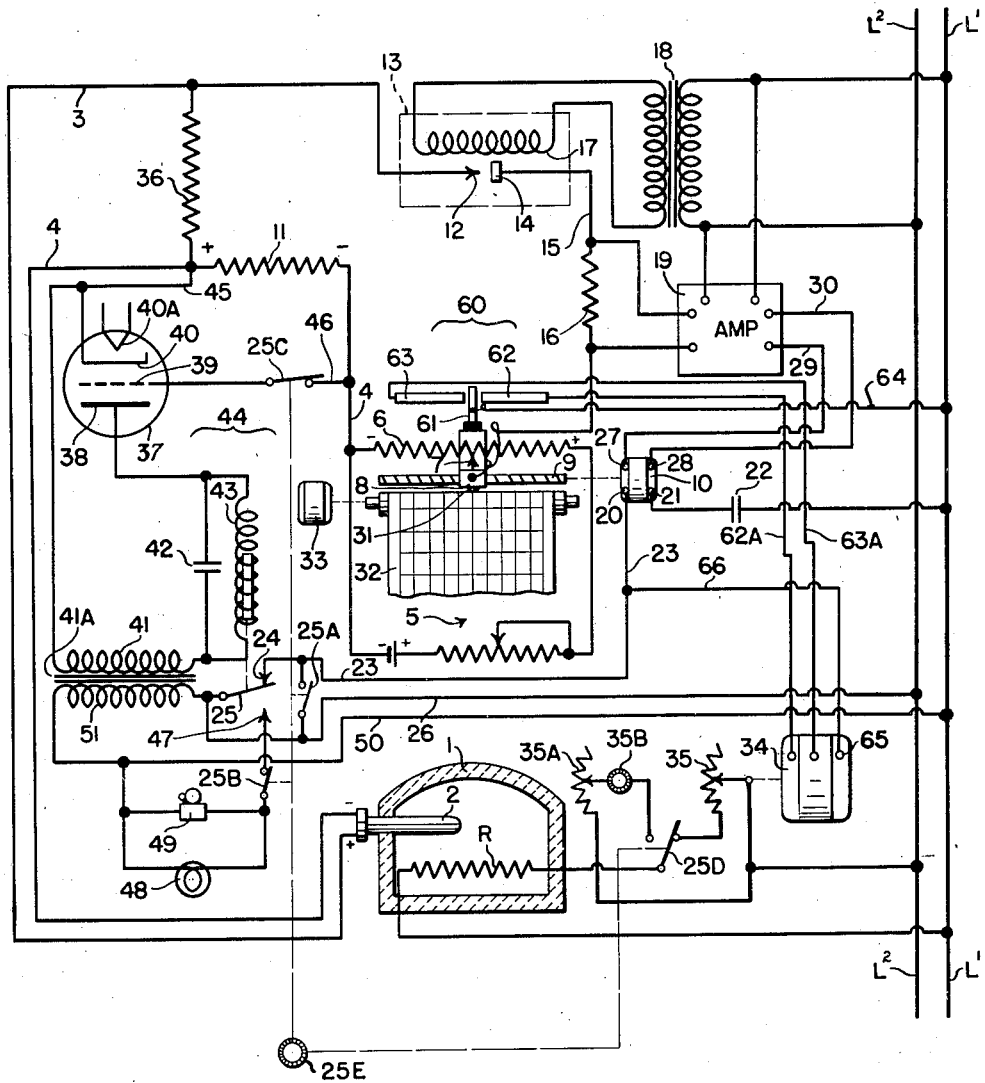
INVENTOR.
CHARLES C. BUSENKELL
BY C. B. Spangenberg
ATTORNEY Patented Oct. 19, 1943

2,332,432

UNITED STATES PATENT OFFICE 2,332,432

CONTROL APPARATUS

Charles C. Busenkell, Montgomery County, Pa., assignor to The Brown Instrument Company, Philadelphia, Pa., a corporation of Pennsylvania Application October 3, 1940, Serial No. 359,511

7 Claims. (Cl. 236—74)

This invention relates to automatic electrical systems for measuring and controlling the magnitude or changes in magnitude of a variable condition.

An object of the invention is to provide in a control system supervisory means to detect the failure of a condition responsive means, which supervisory means shall operate continuously while the said condition-responsive means is in use.

Another object of the invention is to provide a control system including means responsive to the magnitude of a condition wherein failure of said condition-responsive means causes said system to continue its control in accordance with the magnitude of the condition at the moment of failure and to energize a signal to indicate that the system is no longer responsive to changes in said condition.

Another object of the invention is to provide a control system operating in accordance with the electromotive force produced by a thermocouple, wherein failure of said thermocouple causes said control to be disconnected and an alarm to be given.

The arrangement of my present invention is particularly adapted for application to control systems utilizing the null method of measuring a condition to be controlled, that is to say, to control systems in which the circuit for measuring or indicating the condition to be controlled is repeatedly rebalanced and in which the movement of the associated rebalancing apparatus is utilized as a measure of the condition under control. In such systems the failure of certain elements of the measuring circuit results in a complete loss of control of the condition by the control system, under which circumstances the condition under control may assume excessive or destructive values. For example, when the control system is being used to control the supply of heat to a process in response to variations in temperature of the latter, as measured by a thermocouple subjected to the temperature of the process and adapted to control the state of balance of a null type measuring circuit, failure or open circuiting of the thermocouple renders the measuring circuit unresponsive to changes in the temperature of the process and consequently results in loss of control of the temperature of the process by the control system. Under such condition, heating agent will be supplied to the process irrespective of the temperature thereof. As a result the process is permitted to reach an excessive temperature which may cause considerable damage to the work being processed and also to the furnace.

In the prior art, supervisory control systems have been proposed wherein failure or open circuiting of a thermocouple is detected by measuring the impedance to the flow of alternating current of a test circuit including the thermocouple. The test circuits in such prior art arrangements invariably are connected in parallel with the measuring circuit of the control system and in order to test for failure or open circuiting of the thermocouple, provisions are made for intermittently opening the measuring circuit. During the intervals when the measuring circuit is open, the test circuit is completed solely by the thermocouple so that open circuiting of the latter is readily detected. During such test intervals, however, the measuring circuit is unresponsive to variations in the temperature to which the thermocouple is subjected, and therefore, loss of control of the condition, by the control system is experienced. Furthermore, if failure or open circuiting of the thermocouple should occur during an alternate interval when the measuring circuit is closed, the control system is rendered unresponsive to temperature changes, and accordingly, heating agent is supplied irrespective of the temperature of the process. This requires that the intervals between the test intervals be extremely short in order to guard against the establishment of an excessive and destructive temperature, and therefore, frequent disturbance of the measuring circuit.

These defects of the prior art arrangements have been avoided in accordance with my present invention by eliminating the necessity of disturbing the measuring circuit, that is to say, dispensing with the use of an interrupter or a like device for the measuring circuit and thus making the control system continuously responsive to the temperature of the thermocouple and also continuously responsive to failure thereof.

All of the supervisory control systems of the prior art of which I am aware, moreover respond to thermocouple failure by actuating the control system as required to cut off the supply of heating agent. In some cases, such as in certain steps of the process of refining oil, it is not practical to discontinue the supply of heating agent merely because of thermocouple failure because such discontinuance upsets the process and results in either an inferior finished product or a finished product unfit for use and possibly may result in a hazardous or dangerous condition arising. It is desirable in such processes, therefore, that the process be allowed to continue under manual or other emergency control upon failure of the thermocouple.

Disturbance of the process under control because of thermocouple failure is avoided through the use of the apparatus of my present invention which is operative on thermocouple failure to immediately cause the control system to cease functioning and to give an alarm so that an operator capable of carrying on the process manually is advised at once of the thermocouple failure.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

The single figure of the drawing, which illustrates somewhat diagrammatically a preferred embodiment of my invention, shows a furnace 1, in which a thermocouple 2 is inserted so as to develop an E. M. F. in proportion to the temperature therein. Heat is supplied to the furnace 1 by a heating resistor R, and the current flow through the latter is controlled by means to be described in accordance with the E. M. F. developed by the thermocouple 2.

The thermocouple 2 has its terminals connected by a pair of conductors 3 and 4 to the terminals of a null point potentiometric network 5 which may be located at a distance from the thermocouple. The network 5 includes a slidewire resistance 6 and an associated contact 7, which is capable of being moved along the length of the slidewire, and may be of any suitable type, for example, such as the Brown potentiometric network disclosed in Patent 1,898,124, issued to Thomas R. Harrison, February 21, 1933.

The movable contact 7 of the potentiometer is attached to a suitable carrier which, for example, may be in the form of an internally threaded nut 8 adapted to ride on a screw threaded rod 9 which is rotated in one direction or the other under control of the thermocouple 2. A reversible motor 10 is coupled in any convenient manner to the screw threaded rod 9 to rotate the latter with the desired speed and in the desired direction and thereby to move contact 7 along the slidewire 6 to rebalance the potentiometer when the latter is unbalanced.

One terminal of the thermocouple 2 is connected by the conductor 4, in which a resistance 11 is inserted, to the left end of the slidewire 6, as seen in the drawing, and the other terminal of the thermocouple is connected by the conductor 3 to one contact 12 of an interrupter or converting device 13. A second contact 14 of the interrupter is connected by a conductor 15, in which a resistor 16 is inserted, to the contact 7.

The interrupter 13 operates to convert the direct currents resulting from unbalance of the potentiometric network 5 into pulsating currents capable of being readily amplified. Any well-known form of interrupter may be used. The contacts 12 and 14 of the interrupter shown are opened and closed by a winding 17 which is energized, through an isolating transformer 18, from alternating current supply lines $L_1$ and $L_2$. Upon energization of winding 17, contacts 12 and 14 will be alternately opened and closed, thus intermittently breaking the circuit. The winding 17 may desirably be polarized so that the circuit will be interrupted at supply line frequency.

The periodic interruption of the current which flows in the potentiometric network 5 when an unbalanced condition obtains produces a pulsating potential drop across the resistance 16. This potential drop is either in phase with the supply line voltage, or is displaced in phase 180° therefrom, depending upon the direction of current flow in the potentiometric network, and consequently upon the direction of deviation of the temperature of furnace 1 from the desired value. This potential drop is impressed on the input terminals of an electronic amplifier 19, wherein it is amplified, and the amplified quantity is applied to the terminals of the reversible motor 10.

The motor 10 is provided with three separate windings (not shown) having a common terminal 20. The first of these windings is connected between the terminal 20 and a terminal 21 on the motor, and is energized from the supply lines $L_1$ and $L_2$ through a circuit which may be traced from $L_1$, through a condenser 22, terminal 21, the said first winding, terminal 20, a conductor 23, a contact 24, a switch arm 25, and a conductor 26 to line $L_2$. A normally open manually operable knife switch 25A, which in a closed position shunts the switch arm 25 and contact 24, is also provided. The purpose of this switch 25A is explained in detail hereinafter. When switch 25A is in its closed position or when the said switch 25A is in its open position, as shown, and the switch arm 25 is in engagement with contact 24, which is the normal operating positions of the switches the first motor winding is energized and the current flow through it, due to the presence of condenser 22, is displaced substantially 90° in phase from the line voltage. The second and third motor windings are connected between the common terminal 20 and terminals 27 and 28, respectively. The energizing circuit for the second winding may be traced from line $L_1$, through amplifier 19, a conductor 29, terminal 27, the second winding, and terminal 20 to line $L_2$. The energizing circuit for the third winding may be similarly traced from line $L_1$, through amplifier 19, a conductor 30, terminal 28, the third winding, and terminal 20 to line $L_2$.

The amplifier 19 transmits energy to the second winding of motor 10 through conductor 29 when the pulsating potential impressed across the resistance 16 is in phase with the line voltage, and transmits energy to the third motor winding through conductor 30 when the potential across resistance 16 is 180° out of phase with the line voltage. When the first winding alone is energized, no torque is transmitted to the rotor of motor 10. When the first and second windings are energized, the reaction of their magnetic fields produces a torque tending to rotate the rotor in the opposite direction, and when the first and third windings are energized, a torque is produced tending to rotate the rotor in the opposite direction. It may be seen, therefore, that the motor 10 responds to a change in the E. M. F. developed by thermocouple 2 by moving the contact 7 along the slidewire 6 in the proper direction to rebalance the potentiometric network 5 on unbalance of the latter.

If desired, a pen 31 may be mounted on the carriage 8 which carries the contact 7 and arranged in cooperative relation with a recorder chart 32 to thereby provide a continuous record of the temperature of the furnace in which the thermocouple 2 is inserted. The chart 32 may be a strip chart, as shown, and may be driven in any convenient manner, as by a unidirectional motor 33 through suitable gearing (not shown) so that a record of the temperature to which the thermocouple 2 is subjected will be recorded as a continuous line on the chart.

It will be apparent that the reversible electrical motor 10 may be employed to operate the furnace heating resistor R for varying the application of the supply of heat to the furnace 1 or, preferably, a separate motor may be so employed. For example, as illustrated in the drawing, a reversible motor 34 having two opposed field windings (not shown) may be used for this purpose. To this end the motor 34 is operatively connected to a rheostat 35 which controls the flow of current from the supply lines $L^1$ and $L^2$ through the furnace heating resistor R. The mechanical connection of the rheostat 35 is such as to increase and decrease the supply of electric current through the heating resistor R as the furnace temperature rises above or falls below a predetermined level.

The motor 34 is energized for rotation in one direction or the other depending on which of the two field windings is energized by means of the switch 60. As may be noted on the drawing current flows from line $L^1$ through conductor 64 to switch arm 61, which is insulated from but may be carried by the same support, as contact 7, thence by either contact 62 or 63, conductor 62A or 63A, forward or reverse field winding of motor 34, respectively, a terminal 65, common to both windings, conductors 66, 23, contact 24, switch arm 25 and conductor 26 to line $L^2$. Although not shown the contacts 62 and 63 of the switch 60 are made adjustable so that both the control point setting and sensitivity may be set as is well known in the art.

The resistor 11, inserted in conductor 4, has one of its terminals connected through a resistor 36 to conductor 3. When the potentiometric network 5 is balanced, or nearly so, there is little or no current flowing through resistor 11, and hence the potential drop across resistor 11 is zero or substantially so. If the thermocouple 2 should fail, however, the full voltage between the left end of the potentiometer slidewire 6 and the contact 7 is impressed across resistors 36 and 11. The potential drop thus produced across the resistor 11 is relatively large compared to the potential drop thereacross when the thermocouple 2 is intact and is utilized to control the output of an electric discharge device 37 and thereby to effect a supervisory action on the measuring and control system disclosed.

The discharge device 37 is illustrated as a triode having an anode 38, a control electrode 39, a cathode 40 and a heater filament 40A. The heater filament 40A is supplied with energizing current from any suitable current source, not shown. The output circuit of the discharge device 37 is supplied with energy from a circuit which may be traced from the right end terminal of the secondary winding 41 of a transformer 41A through a condenser 42 which is connected in parallel with a winding 43 of a relay 44, anode 38 of discharge device 37, and cathode 40 back to the left end terminal of the transformer secondary winding 41. The transformer 41A also includes a line voltage primary winding 51 the terminals of which are connected to the alternating current supply conductors $L^1$ and $L^2$ through conductors 50 and 26. Relay 44 controls the position of switch arm 25. When relay 44 is energized, switch arm 25 engages the front contact 24 to thereby complete the circuit previously described through the windings of motors 10 and 34. When the relay 44 is deenergized, switch arm 25 falls down upon back contact 47, completing a circuit through a signal light 48 and an audible signal 49, which circuit may be traced from line $L^1$, through conductor 50, signals 48 and 49 in parallel, a normally closed manually operable switch 25B, contact 47, switch 25 and conductor 26 to line $L^2$.

Resistor 11 is adapted to be connected in the input circuit of discharge device 37, which input circuit may be traced from cathode 40 through a conductor 45, resistor 11 and a conductor 46 in which a normally closed manually operable switch 25C is inserted, to control electrode 39.

As illustrated a fourth knife switch 25D which is manually operable in unison with the knife switches 25A, 25B and 25C is also provided. This knife switch is adapted to disconnect the rheostat 35 from the energizing circuit to the furnace heating resistor R and to connect a manually adjustable rheostat 35A in the energizing circuit to the furnace heating resistor R instead. The rheostat 35A is manually adjustable by manipulation of a knob 35B.

The switches 25B, 25C and 25D may desirably be knife switches and preferably are mechanically connected with the knife switch 25A so that all of the switches may be adjusted by manipulation of a single knob 25E. The switches are in the positions shown when the system is in normal operation and the supervisory control system of my invention is effective to perform its intended function.

When all of the knife switches are in the positions illustrated in the drawing, the supervisory control system of my invention and including the discharge device 37 is adapted to cause deenergization of the reversible electrical motors 10 and 34 to effect energization of the signalling devices 48 and 49 upon failure of the thermocouple 2. When the knife switches are adjusted out of the positions shown in the drawing, however, the supervisory control network is disconnected from the control system.

In the ordinary use of the control system illustrated it may be desirable at certain times to effect such disconnection of the supervisory control network. For example, during the time of initial heating of the furnace, the electromotive force developed by the thermocouple 2 is small and therefore if the supervisory control network were connected into the system it would effect the deenergization of the motors 10 and 34 and effect actuation of the signalling devices 48 and 49 if at that time the contact 7 were at a position along slidewire 6 such that the slidewire E. M. F. greatly exceeded the thermocouple E. M. F. By manual manipulation of the knife switches out of the positions shown in the drawing, however, the supervisory control network may be disconnected from the control system as explained, and the furnace temperature raised up to the desired level by manual adjustment of the rheostat 35A. Then, when the furnace temperature has been brought up to the desired level, the knife switches may be adjusted into the positions shown in the drawing to thereby connect the supervisory control network into the control system. During the normal operation of the system illustrated, the potentiometer contact 7 will engage the slidewire 6 at a position intermediate the ends of the latter so that upon failure of the thermocouple 2 a potential of sufficient magnitude to render the discharge tube 37 non-conductive will be impressed across the resistor 11.

During the operation of the system with the supervisory control system connected into the system, there is normally little or no potential drop across resistor 11, and accordingly, cathode 40 and control electrode 39 are at nearly the same potential whereby the discharge device 37 is conductive. Consequently, relay winding 43 is energized, and the motor circuits are closed at contact 24.

Upon thermocouple failure, however, the potential drop produced, as previously explained, across resistor 11, causes a reduction in the output current of the discharge device 37, sufficient to deenergize relay winding 43, thereby causing switch arm 25 to engage back contact 47, energizing the signals 48 and 49, and opening the circuits to motors 10 and 34 at contact 24. It is noted that the potential drop produced across resistor 11 by the normal flow of unbalanced potentiometer currents therethrough is insufficient to cause deenergization of the relay winding 43. Such deenergization is effected only on failure of the thermocouple 2 which, as explained previously, permits the establishment of a relatively large potential drop of the polarity indicated across resistance 11.

It may be seen, therefore, that the device of the present invention responds to the failure of the thermocouple by disconnecting the control means and energizing an alarm. The process under control is not disturbed because of the thermocouple failure. It should be noted, moreover, that the system is continuously responsive to the temperature of the thermocouple and to its conductive condition.

It will be readily understood that the resistor 16 and its associated amplifier could be replaced by a contact-making galvanometer, or other equivalent means. Also, it will be apparent that the amplifier system including the discharge device 37 may be modified by means well known in the art, to provide a more sensitive arrangement. The amplifier system shown was chosen for the sake of simplicity, in order that the exact nature of my invention might be more clearly pointed out.

While in accordance with the provisions of the statutes I have illustrated and described the best form of embodiment of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent, is:

1. In a control system having a thermocouple responsive to a temperature condition to produce an electromotive force variable in magnitude in accordance with said temperature condition, means to detect failure of said thermocouple, comprising a first resistor connected in parallel with said thermocouple, a second resistor connected in series with said thermocouple and said first resistor, an electrical network including a source of electrical potential, said thermocouple, and said resistances and having a normal condition in which a potential from said source is balanced against said electromotive force, thereby substantially preventing a flow of current through said second resistance, means responsive to an unbalanced condition of said network due to a change in said temperature to restore said normal condition, thereby keeping said current flow at a minimum, and means responsive to a relatively large current flow through said second resistance occurring upon failure of said thermocouple to render said restoring means inoperative.

2. In measuring apparatus having a thermocouple responsive to a temperature to produce an electromotive force variable in magnitude in accordance with said temperature, means to detect failure of said thermocouple, comprising a first resistor connected in parallel therewith, a second resistor connected in series with said thermocouple and said first resistor, an electrical network including a source of electrical potential, said thermocouple and said resistances and having a normal condition in which a potential from said source is balanced against said electromotive force, thereby substantially preventing a flow of current through said second resistance, means responsive to an unbalanced condition of said network due to a change in said temperature to restore said normal condition, thereby keeping said current flow at a minimum, a signal to indicate failure of said thermocouple, and means responsive to a relatively large current flow through said second resistance occurring upon thermocouple failure to render said signal operative.

3. In a control system having a thermocouple responsive to a temperature condition to produce an electromotive force variable in magnitude in accordance with said temperature condition, means to detect failure of said thermocouple, comprising a first resistor connected in parallel with said thermocouple, a second resistor connected in series with said thermocouple and said first resistor, an electrical network including a source of electrical potential, said thermocouple, and said resistances and having a normal condition in which a potential from said source is balanced against said electromotive force, thereby substantially preventing a flow of current through said second resistance, means responsive to an unbalanced condition of said network due to a change in said temperature to restore said normal condition, thereby keeping said current flow at a minimum, an electrically operated signal to indicate failure of said thermocouple, and electronic amplifying means responsive to a relatively large current flow through said second resistance occurring upon failure of said thermocouple to render said restoring means inoperative and to render said signal operative.

4. A control system including in combination a self balancing electrical measuring network, a condition responsive means continuously connected in said network adapted to unbalance said network in accordance with the magnitude of said condition, means to rebalance said network upon unbalance thereof, means controlled by said rebalancing means to control said condition, and electric discharge means independent of said rebalancing means continuously responsive to a characteristic of said condition responsive means to supervise the control action of said control means.

5. A control system including in combination a self balancing electrical measuring network, a condition responsive means continuously connected in said network adapted to unbalance said network in accordance with the magnitude of said condition, means to rebalance said network upon unbalance thereof, means responsive to unbalance of said network to control said rebalancing means, means controlled by said rebalancing means to control said condition, and means independent of said network unbalance responsive means and continuously responsive to a characteristic of said condition responsive means to supervise the control action of said control means.

6. A control system including in combination a self balancing electrical measuring network, a condition responsive means continuously connected in said network adapted to unbalance said network in accordance with the magnitude of said condition, means to rebalance said network upon unbalance thereof, means controlled by said rebalancing means to control said condition, an electrically operated signal to indicate failure of said condition responsive means, and electronic means continuously responsive to a characteristic of said condition responsive means to supervise the control action of said control means and the operation of said signal.

7. A control system including in combination a self balancing electrical measuring network, a thermocouple responsive to a temperature condition to be controlled to produce an electromotive force variable in magnitude in accordance with said temperature and adapted to unbalance said network upon changes in said temperature, means to rebalance said network upon unbalance thereof, means responsive to unbalance of said network to control said rebalancing means, means controlled by said rebalancing means to control said condition, and means independent of said network unbalance responsive means and continuously responsive to failure of said thermocouple to supervise the control action of said control means.

CHARLES C. BUSENKELL.